(12) United States Patent
Miljkovic et al.

(10) Patent No.: US 9,930,900 B2
(45) Date of Patent: Apr. 3, 2018

(54) LOW-MYCOTOXIN COFFEE CHERRY PRODUCTS

(71) Applicant: VDF FutureCeuticals, Inc., Momence, IL (US)

(72) Inventors: Dusan Miljkovic, San Diego, CA (US); Brad Duell, Kailua Kona, HI (US); Vukosava Miljkovic, San Diego, CA (US)

(73) Assignee: VDF Futureceuticals, Inc., Momence, IL (US)

( * ) Notice: Subject to any disclaimer, the term of this patent is extended or adjusted under 35 U.S.C. 154(b) by 312 days.

(21) Appl. No.: 14/089,368

(22) Filed: Nov. 25, 2013

(65) Prior Publication Data
US 2014/0079850 A1    Mar. 20, 2014

Related U.S. Application Data

(62) Division of application No. 12/899,385, filed on Oct. 6, 2010, now Pat. No. 8,597,710, which is a division of application No. 10/552,945, filed as application No. PCT/US03/11950 on Apr. 16, 2003, now Pat. No. 7,815,959.

(51) Int. Cl.
| | |
|---|---|
| *A23F 5/02* | (2006.01) |
| *A23F 5/08* | (2006.01) |
| *A23F 3/34* | (2006.01) |
| *A23F 5/16* | (2006.01) |
| *A23F 5/24* | (2006.01) |
| *A23F 3/16* | (2006.01) |

(52) U.S. Cl.
CPC ............... *A23F 5/08* (2013.01); *A23F 3/16* (2013.01); *A23F 3/34* (2013.01); *A23F 5/02* (2013.01); *A23F 5/16* (2013.01); *A23F 5/24* (2013.01)

(58) Field of Classification Search
CPC ............ A23V 2002/00; A23V 2250/21; A23V 2250/2108; A23L 33/105; A23L 2/39; A21D 10/005; A23F 5/02; A23F 5/00
USPC .......................... 426/594, 615, 592, 432, 45
See application file for complete search history.

(56) References Cited

U.S. PATENT DOCUMENTS

| | | | |
|---|---|---|---|
| 2,526,872 | A | 10/1950 | Johnston et al. |
| 2,872,323 | A | 2/1959 | Perech |
| 5,178,832 | A | 1/1993 | Phillips et al. |
| 2002/0155210 | A1 | 10/2002 | Hardesty et al. |
| 2002/0160067 | A1 | 10/2002 | Zapp et al. |
| 2002/0187239 | A1* | 12/2002 | Miljkovic et al. ............ 426/590 |
| 2003/0152612 | A1 | 8/2003 | Pugliese et al. |
| 2010/0080885 | A1* | 4/2010 | Miljkovic et al. ............ 426/594 |

FOREIGN PATENT DOCUMENTS

| | | |
|---|---|---|
| CA | 1104410 | 7/1981 |
| CN | 1108069 | 9/1995 |
| CN | 1273797 | 11/2000 |
| CN | 99114866.5 | 11/2000 |
| EP | 0157043 | 10/1985 |
| EP | 1593735 | 11/2005 |
| GB | 836464 | 6/1960 |
| GB | 2026839 A | 2/1980 |
| GB | 2304050 | 3/1997 |
| JP | 6183989 | 7/1994 |
| JP | 7145067 | 6/1995 |
| JP | 8092057 | 4/1996 |
| JP | 8301722 | 11/1996 |
| JP | 2001354545 | 12/2001 |
| JP | 2006528953 | 12/2006 |
| WO | 99/23890 | 5/1999 |
| WO | 02/062159 | 8/2002 |
| WO | 02/085397 | 10/2002 |
| WO | 2004/054534 | 7/2004 |
| WO | 2004098320 | 11/2004 |
| WO | 2005/102373 | 11/2005 |

OTHER PUBLICATIONS

Illy, Andrea and Rinantonio Viani, Espresso Coffee, The Science of Quality, 1995, Elsevier Academic Press, pp. 163-164.*
Avallone, S. et al."Polysaccharide Constituents of Coffee-Bean Mucilage", Journal of Food Science: Food Chemistry and Toxicology, 2000, vol. 65, No. 8, pp. 1038-1311.
Bucheli, P. et al., "Development of Ochratoxin A during Robusta (*Coffee canephora*) Coffee Cherry Drying", Journal of Agriculture and Food Chemistry, 2000, vol. 48, pp. 1358-1362.
Bucheli, P. et al., "Research on the Origin and on the Impact of Post-Harvest Handling and Manufacturing of the Presence of Ochratoxin A in Coffee", Food Additives and Contaminants, vol. 19, No. 7, 2002, pp. 655-665.
Davids, K., "Home Roasting Coffee: Romance & Revival", webpage from Amazon.com with link to book, 1996, Publisher St. Martins Press, US.
Joosten, H.M.L.J. et al., "Production of ochratoxin Aby Aspergillys carbonarius on coffee cherries", International Journal of Food Microbiology, 2001, vol. 65, pp. 39-44.
Levi, C., "Myco Toxins in Coffee", Journal of the Association of Official Analytical Chemists, Database Biosis (Online), retrieved Mar. 27, 2006.
Lorenzetti, D. et al., "The Birth of Coffee", Clarkson Potter Publishers, New York, 2000, pp. 16 & 49.
Merrian-Webster Dictionary, "Extract—Definition", Merriam-Webster.com, retrieved Mar. 15, 2013.

(Continued)

*Primary Examiner* — Erik Kashnikow
*Assistant Examiner* — Hong T Yoo
(74) *Attorney, Agent, or Firm* — Umberg Zipser LLP

(57) ABSTRACT

A coffee cherry is harvested, preferably in a sub-ripe state, and quick-dried to provide a basis for numerous nutritional products. Such coffee cherries and portions thereof may be particularly characterized by their extremely low concentration of mycotoxins, including various aflatoxins, fumonisins, ochratoxins, and/or vomitoxin (DON, deoxynivalenol).

5 Claims, No Drawings

(56) References Cited

OTHER PUBLICATIONS

Pandey, A. et al, "Biotechnological potential of coffee pulp and coffee husk for bioprocesses", Biochemical Engineering Journal, Oct. 2000, vol. 6, No. 2, pp. 153-162.
Pendergrast, M., "Uncommon Grounds: The History of Coffee and How it Transformed our World", Basic Books, New York, 2010, p. 4.
Schroder, M., "Food Quality and Consumer Value", Springer-Verlay Berlin Heidelber, New York, 2003, pp. 191.
Suzuki, T. et al., "Biodegradation of caffeine: Formation of theophyline and theobromine from caffeine in mature Coffea arabica fruits", Journal of Scientific Good Agriculture, 1984, vol. 35, pp. 66-70.
Tucker, C.M., "Coffee Culture Local Experiences, Global Connections", Routledge Taylor & Francis Group, New York & London, 2010, p. 36.
Ukers, W.H., "All About Coffee", Second Edition, The Tea & Coffee Trade Journal Company, New York, 1935, pp. 357 & 540.
Webster'S New World Dictionary, Third College Edition, "Extract—Definition", 1998, p. 482.
Wild, A., "Coffee: A Dark History", W.W. Norton & Company, New York & London, 2004, p. 41.
VDF Futureceuticals V. Sandwich Isles Trading Company (Case No. CV11-00288ACK-RLP) SITC's Preliminary Invalidity Contentions, Oct. 5, 2011.
Pittet, Alain et al., "Liquid Chromatographic Determination of Ochratoxin A in Pure and Adulterated Soluble Coffee Using an Immuniaffinity Column Cleanup Procedure", Journal of Agricultural and Food Chemistry, vol. 44, No. 11, Jan. 1, 1996, pp. 3564-3569.
Database WPI, Section Ch, Week 200119, Thomson Scientific, London, XP-002299650; CN1273797A, Xu, J; Nov. 22, 2000.
Database GNPD (Online) Mintel, Nov. 2009, Anonymous, "Jus de Plantes/Plant Juices"; retrieved from www.gnpd.com; Database accession No. 79216.

\* cited by examiner

LOW-MYCOTOXIN COFFEE CHERRY PRODUCTS

This application is a divisional of U.S. application Ser. No. 12/899,385, filed Oct. 6, 2010, which is a divisional application of U.S. application Ser. No. 10/552,945, filed Aug. 9, 2006 now issued as U.S. Pat. No. 7,815,959, which is a U.S. national phase application of PCT/US03/11950, filed Apr. 16, 2003. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is food products, and especially food products prepared from whole quick-dried sub-ripe coffee cherries, or fragments/portions thereof.

BACKGROUND OF THE INVENTION

Various parts of the coffee tree have been used for nutritional purposes for a relatively long time (see e.g., Pendergrast, M. *Uncommon Grounds*. Basic Books: New York, 1999). For example, coffee tree leaves and fresh, ripe coffee cherries were boiled to make tea. In other examples, the pulp of the coffee cherry can be fermented to produce wine as described in Chinese Patent CN 1021949. In a still further well known example, the seeds (i.e., the beans) of the coffee tree are extracted from the cherry, dried, roasted, ground, and extracted with hot water to provide the beverage that many users enjoy as coffee.

Unfortunately, coffee cherries, and especially the pulp and husk tend to rapidly spoil in the presence of molds, fungi, and other microorganisms, and therefore contain almost always significant levels of mycotoxins (see e.g., Pittet, A., Tornare, D., Huggett, A., Viani, R. Liquid Chromatographic Determination of Ochratoxin A in Pure and Adulterated Soluble Coffee Using anf Immunoaffinity Column Cleanup Procedure. *J. Agric. Food Chem.* 1996, 44, 3564-3569; or Bucheli, P., Kanchanomai, C., Meyer I., Pittet, A. Development of Ochratoxin A during Robusta (*Coffea canephora*) Coffee Cherry Drying. *J. Agric. Food Chem.* 2000, 48, 1358-1362). Thus, beverages produced from the coffee pulp, husk, mucilage, and/or whole coffee cherry generally failed to find acceptance as beverage ingredients (Although one product is advertised as "coffee cherry tea" [http://www.paradiserelocation.com/paradisetogo/foodproducts.htm], the product is actually made from coffee cherry pulp and was recently determined to have substantial quantities of mycotoxins).

Even in situations where the pulp, mucilage, and hull is removed, mycotoxins may still be present on and/or in the coffee bean. Consequently, considerable efforts have been undertaken to detoxify coffee beans and other food products. For example, where the mycotoxin is already present in the food product, selected mycotoxins can be extracted from the food product using various solvents and procedures as described in U.S. Pat. No. 4,436,756 to Canella et al. On the other hand, various mycotoxins can be adsorbed from the food product onto a mineral carrier as described in U.S. Pat. No. 5,935,623 to Alonso-Debolt.

In still other methods, selected mycotoxins can be degraded using enzymes as described in U.S. Pat. No. 5,716,820 to Duvick et al. The inventors in the '820 reference even contemplate that the genes encoding for such enzymes may be cloned to produce transgenic plants that are then thought to be less contaminated with mycotoxins. Alternatively, microorganisms may be employed to destroy enzymatically mycotoxins found in food products as described in U.S. Pat. No. 6,025,188 to Duvick et al.

Where mycotoxins are not yet produced by a microorganism present on a plant or other food stuff, pesticides or other compositions that control microbial growth or production of mycotoxins in microorganisms may be employed. For example, Emerson et al. describe in U.S. Pat. No. 5,639,794 use of a saponin as a synergist to control colonization and/or growth of plant and animal pathogens. Alternatively, as described in U.S. Pat. No. 4,199,606 to Bland, propionic acid on a carrier may be employed as a diffusible growth inhibitor for various microorganisms. Further known compositions (see e.g., U.S. Pat. No. 5,698,599 to Subbiah or U.S. Pat. No. 3,798,323 to Leary) may be employed to suppress or at least reduce synthesis of mycotoxins in a microorganism.

Alternatively, mycotoxin-containing food products may be blended with uncontaminated food products to a concentration that is acceptable and/or below the maximum allowable amount of mycotoxins in food products (see e.g., Herrman, T. and Trigo-Stockli, D.; Mycotoxins in Feed Grains and Ingredients; Kansas State University, May 2002), or (at least potentially) mycotoxin-containing coffee cherry products may be employed in a non-food product. In still other uses, the mycotoxin content may not be considered relevant as the coffee cherry product is incinerated and thus the mycotoxins are at least partially destroyed as described in U.S. Pat. No. 4,165,752, GB 2026839, or CA 1104410. Here, the inventor teaches that the coffee cherries may be compressed, dehydrated, ground, and roasted to yield a smokable product.

However, while most of the known methods reduce the concentration of mycotoxins to at least some degree, numerous disadvantages remain. Among other things, additional processing steps will require dedicated equipment, thereby increasing processing time and costs. Moreover, and especially where pesticides and/or fungicides are used, new problems with residual toxic chemicals may arise.

Thus, despite numerous beneficial properties of coffee cherries and its components, whole coffee cherries are generally not used as food products as mycotoxins are typically present in substantial quantities in the ripe and overripe fruit. Therefore, there is still a need to provide improved methods and compositions for coffee cherries, and especially for products comprising coffee cherries with low or no mycotoxin content for human and veterinary consumption.

SUMMARY OF THE INVENTION

The present invention is directed to compositions and methods that include quick-dried (preferably sub-ripe) coffee cherries or portions thereof, wherein the coffee cherries are substantially devoid of, or have a very low content of mycotoxins.

In one aspect of the inventive subject matter, a food product comprises a preparation of a coffee cherry that is quick-dried such that a mycotoxin level of the coffee cherry is less than 20 ppb for total aflatoxins, less than 10 ppb for total ochratoxins, and less than 5 ppm for total fumonisins. Preferred preparations in such food products include the bean, pulp, mucilage, and/or hull of the quick-dried coffee cherry, or ground fragments of the coffee cherry, or an extract thereof. It is further preferred that the coffee cherry is a sub-ripe coffee cherry. Preferred food products include a tea brewed from the quick-dried (preferably sub-ripe) coffee cherries, or a beverage comprising an extract of the coffee cherry. Alternatively, suitable food products also include nutritional supplements in liquid or solid form comprising an extract of the coffee cherry.

Contemplated sub-ripe coffee cherries have a primarily green color with less than 25% red color, more preferably a primarily red color with less than 25% green color, and even more preferably a primarily red color with less than 5% blemished area. The (sub-ripe) coffee cherries may be quick-dried using various methods, however, it is generally preferred that the coffee cherries are quick dried using heated air or exposure to sun and/or ambient air.

In another aspect of the inventive subject matter, a tea is brewed from a comminuted or ground quick-dried (preferably sub-ripe) coffee cherry or portion thereof, wherein the coffee cherry has a mycotoxin level of less than 20 ppb for total aflatoxins, less than 10 ppb for total ochratoxins, and less than 5 ppm for total fumonisins, and preferably has a polyphenol concentration of at least 10 mg/oz (most preferably at a chlorogenic acid to caffeine ratio of at least 2.7).

Thus, viewed from another perspective, it is contemplated that a quick-dried coffee cherry or portion thereof has a mycotoxin level of less than 20 ppb for total aflatoxins, less than 10 ppb for total ochratoxins, and less than 5 ppm for total fumonisins, preferably having a chlorogenic acid content of at least 2% (wt/wt) and a polyphenol content of at least 3.2% (wt/wt).

Various objects, features, aspects and advantages of the present invention will become more apparent from the following detailed description of preferred embodiments of the invention.

DETAILED DESCRIPTION

The inventors have discovered that low-mycotoxin or even mycotoxin-free tea and other food products may be produced from whole, substantially non-damaged coffee cherries that are preferably picked at a sub-ripe stage, and wherein the coffee cherry is quick-dried after harvest. Among other advantages, the inventors discovered that such coffee cherries significantly reduce the likelihood of infestation of the coffee cherry with mold and fungi known to produce mycotoxins. Still further, the inventors discovered that sub-ripe coffee cherries (in contrast to completely unripe coffee cherries) provide a desirable level of flavor and an aroma profile in the coffee cherry product (e.g., coffee cherry tea) as well as relatively high levels of polyphenols, polysaccharides, and other nutrients.

The term "food product" as used herein refers to any product that is ingested by a human and/or animal for nutritional, health-maintenance, health-improvement, and/or recreational purpose. Particularly preferred food products include those consumed by human, wherein such food products may be solid products (e.g., dietary supplement, snack bar, bagged tea, etc.) or liquid products (e.g., tea or other beverage, syrup or elixir, etc.).

As also used herein, the term "coffee cherry" refers to the fruit of the coffee tree (*Coffea* spec., Family Rubiaceae) in which exocarp and outer mesocarp (i.e., the pulp) surround the inner mesocarp (i.e. the mucilage) and endocarp (i.e., the hull), which in turn surround the seeds (i.e., the beans). Thus, the term coffee cherry specifically refers to a whole coffee cherry, which may or may not include the stem of the cherry.

The term "sub-ripe coffee cherry" refers to a coffee cherry that has not yet reached the ripe stage, which is generally characterized by susceptibility to or presence of a fungal infection and/or presence of mycotoxins. Thus, a sub-ripe coffee cherry is at a ripeness stage in which the coffee cherry—when quick-dried—will exhibit mycotoxin levels that are below 20 ppb for total aflatoxins, below 5 ppm for total fumonisins, below 5 ppm for total vomitoxins, and below 5 ppb for ochratoxins. Consequently, quick-dried coffee cherries are typically dried within 0-48 hours (and more preferably between 6-24 hours) of the harvest such that the residual water content is no higher than 20% (wt/wt), and more typically no higher than 6-12% (wt/wt).

Viewed from an other perspective, sub-ripe coffee cherries generally have a complete or almost complete (at least 95% of the cherry) red color (or in some cases yellow color), and typically include various surface defects (e.g., blemishes, cuts, and/or holes covering an area of more than 5% of the cherry). Thus, a sub-ripe coffee cherry will typically exhibit at least some green color (at least 5%, more typically at least 10%) and will typically be free of any surface defects (e.g., blemishes, cuts, and/or holes covering an area of less than 5% of the cherry). Sub-ripe coffee cherries may also be characterized in that they will remain on the coffee tree for a subsequent round of picking where the coffee cherries are hand picked and used for the production of coffee beans. Alternatively, a color sorting machine with CCD equipment may be employed to identify and select sub-ripe coffee cherries on a quantitative color basis where the coffee cherries are mass-harvested and automatically sorted.

It should further be appreciated that while many of the following aspects and examples employ coffee cherries in a sub-ripe state, completely ripe coffee cherries are also contemplated suitable herein, especially where such ripe coffee cherries are substantially devoid of surface damage (i.e., no more than 5% of surface area) or microbial infection (i.e., infestation that results in mycotoxin levels of less than 20 ppb for total aflatoxins, less than 5 ppm for total fumonisins, less than 5 ppm for total vomitoxins, and less than 5 ppb for ochratoxins on a dry weight basis). Thus, all contemplated food products and/or coffee cherries may comprise completely ripe as well as sub-ripe coffee cherries in varying proportions. For example, suitable proportions include 100% ripe: 0% sub-ripe, preferably 90% ripe: 10% sub-ripe, more preferably 75% ripe: 25% sub-ripe, even more preferably 50% ripe: 50% sub-ripe, and most preferably less than 25% ripe: more than 75% sub-ripe.

As further used herein, the term "quick-dried" coffee cherry means that the whole coffee cherry is dried under a protocol that limits growth of molds, fungi, and/or yeast to an extent such that the dried coffee cherry will exhibit mycotoxin levels that are below 20 ppb for total aflatoxins, below 5 ppm for total fumonisins, below 5 ppm for total vomitoxins, and below 5 ppb for ochratoxins. Consequently, quick-dried coffee cherries are typically dried within 0-48 hours (and more preferably between 6-24 hours) of the harvest such that the residual water content is no higher than 20% (wt/wt), and more typically no higher than 6-12% (wt/wt).

As still further used herein, the term "mycotoxin" refers to any toxic product formed in a mold, fungus, and/or yeast that exhibits significant toxicity to a human or animal when ingested. Thus, specifically contemplated mycotoxins include aflatoxins (and particularly B1, B2, G1, and G2), fumonisins (and particularly B1, B2, and B3), ochratoxin, deoxynivalenol (DON, vomitoxin), T-2 toxin, and zearalenone. The term "total aflatoxins" therefore refers to the sum of all aflatoxin variants, the term "total fumonisins" refers to the sum of all fumonisin variants, and the term "total ochratoxins" therefore refers to the sum of all ochratoxin variants.

In one exemplary aspect of the inventive subject matter, whole undamaged sub-ripe (e.g., semi ripe or almost ripe) coffee cherries are hand picked and within about one hour quick-dried using a dry air drier at about 140° F. until constant weight is obtained. The so obtained coffee cherries typically possess significant storage stability, high resistance to infection by fungi, and lower shipping weight than wet cherry.

It is generally contemplated that the sub-ripe coffee cherries may be derived from various sources, and the particular use of the sub-ripe coffee cherries will at least in part determine the particular source(s). However, it is preferred that the sub-ripe coffee cherries are derived from a single coffee species (e.g., *coffea arabica*), which is cultivated under similar growth conditions (e.g., shade-grown). Among other advantages, it is contemplated that a single source of coffee cherries will facilitate quick-drying the sub-ripe coffee cherries. It should be recognized, however, that once the sub-ripe coffee cherries are quick-dried, various coffee species and/or coffee cherries from various growth conditions may be blended to achieve a mixture with particularly preferred characteristics.

Furthermore, it should be appreciated that depending on the particular product or use for the coffee cherry, the degree of ripeness of the coffee cherry may vary considerably. For example, where extraction of polyphenols and/or chlorogenic acid from the whole coffee cherry is desired, semi-ripe (stage 1 or stage 2) coffee cherries may be used. On the other hand, where the coffee cherry is used for the production of a coffee cherry tea and flavor and aroma are paramount, almost ripe coffee cherries may be picked. In still further contemplated aspects, unripe coffee cherries, or any reasonable mixtures of varying ripeness degrees may be used. Especially where the coffee cherry is a ripe coffee cherry, it is contemplated that the whole cherry is preferably free of surface defects, including cracks, splits, holes, or other openings. However, while not preferred, coffee cherries with surface defects may also be used. While not limiting to the inventive subject matter, it is generally preferred that the sub-ripe coffee cherries (or coffee cherry mixtures) are washed with water or other aqueous solution (e.g., diluted hypochlorite solution) to remove soil particles and other debris before drying.

Quick-drying is preferably performed immediately after picking to up to about two days after picking until a constant weight is obtained (or until the outer pulp of the cherry has dried). Thus, and depending on the particular heat source available, it is generally preferred that quick-drying is performed at a temperature of about 100° to about 180° F. for a period of about 6-48 hours. For example, where electrical (or other) energy is readily available, the sub-ripe coffee cherries may be dried in a warm air drier in a stationary or rotating drum, or in a refractance window drying process. Alternatively, the sub-ripe coffee cherries may also be freeze dried. On the other hand, and especially where energy sources are not readily available, the sub-ripe coffee cherries may be sun dried. However, regardless of the particular drying method, it should be recognized that the sub-ripe coffee cherries are quick-dried to prevent production of mycotoxins from fungi, molds, and/or yeast that are already present and/or colonize (e.g., via infection or sporulation) the coffee cherry. Thus, sub-ripe coffee cherries are advantageously dried on a surface that is clean and free of sources of mycotoxin contamination. In further alternative aspects of the inventive subject matter, the sub-ripe coffee cherries may also be frozen and stored/transported until quick-drying can be implemented.

The so obtained quick-dried sub-ripe coffee cherries may then without further mycotoxin detoxification be employed for various uses in numerous food products. For example, where the whole quick-dried sub-ripe coffee cherry is used in a food product, the coffee cherry may be admixed with another consumable (e.g., admixture with grain for animal feed, or coating with chocolate for human consumption). In another especially preferred example, the quick-dried sub-ripe coffee cherry is ground and used as a food additive or as a basis for brewing coffee cherry tea (e.g., for use as loose tea, grinding to a size of 500-3000 µm is preferred, or for bagged teas, grinding to a size of 200-1000 µm is preferred).

Alternatively, it should be recognized that only parts of the quick-dried sub-ripe coffee cherry may be employed in a food product. For example, where the sub-ripe coffee cherry is in an almost ripe state, it is contemplated that the pulp, mucilage, and/or hull may be separated from the seeds, which are then (optionally admixed with other seeds) roasted to commercial grade coffee beans. The remaining pulp, mucilage, and/or hull from the quick-dried sub-ripe coffee cherry may then be employed as food additive or basis for extraction of one or more desired components (e.g., polyphenols).

In still further contemplated uses of so obtained quick-dried sub-ripe coffee cherries, it is contemplated that the coffee cherries (or portions thereof) may be employed as starting material for extraction of various beneficial components. For example, the quick-dried sub-ripe coffee cherries may be extracted with an aqueous (e.g., water, water-ethanol mixture) or non-aqueous solvent (e.g., critical point $CO_2$, dimethylformamide) to isolate one or more components that can be used in a food product. For example, quick-dried sub-ripe coffee cherries may provide an excellent source of polyphenols, chlorogenic acid, and/or caffeine.

The term "polyphenol" as used herein refers to a diverse group of compounds produced by a plant, wherein the compounds include a phenol ring to which at least one OH group, and more typically at least two OH groups are covalently attached. For example, representative polyphenols include ellagic acid, tannic acid, vanillin, caffeic acid, chlorogenic acid, ferulic acid, catechins (e.g., epicatechin gallate, epigallocatechin), flavonols (e.g., anthocyanidins, quercetin, kaempferol), and various other flavonoids, and their glycosides and depsides. Furthermore, contemplated polyphenols may also be in oligomeric or polymeric form (e.g., oligomeric proanthocyanidins or condensed tannins).

In another preferred aspect of the inventive subject matter, the inventors contemplate use of whole quick-dried sub-ripe coffee cherries in the production of various beverages. For example, it was observed that teas produced from unripe (green) and semi-ripe stage 1 whole quick-dried coffee cherries possess relatively low aroma and flavor characteristics. Thus, extracts or at least partially condensed teas from unripe (green) and semi-ripe stage 1 whole quick-dried coffee cherries may be added as low-flavor additive to a commercially available beverage to enhance the nutritional properties.

As ripeness increases, more aroma and flavor is evident in the quick-dried sub-ripe coffee cherries. Consequently, tea produced from semi-ripe stage 2 and almost ripe whole coffee cherries will possess high aroma and fruity flavor, and the inventors contemplate that semi-ripe and almost ripe coffee cherries could be used directly after quick-drying and grinding for a "Whole Coffee Fruit Tea", either by itself or after placing into tea bags. As illustrated below, such a tea would provide high levels of polyphenols, typically 60-70 mg per 6 oz. cup. Furthermore, teas prepared from whole quick-dried sub-ripe coffee cherries generally possess relatively high ratios of chlorogenic acid to caffeine (typically about 2-4.5) as compared to beverages made from roasted coffee (typically about 0.4). Therefore, it should be appreciated that tea prepared from quick-dried sub-ripe coffee cherries is much more nutritional (based upon polyphenols and chlorogenic acid) than roasted coffee.

Therefore, the inventors contemplate a food product that includes a preparation of a (preferably sub-ripe) coffee cherry that is quick-dried such that a mycotoxin level of the coffee cherry is less than 20 ppb for total aflatoxins, less than 10 ppb for total ochratoxins, and less than 5 ppm for total fumonisins. Alternatively, contemplated mycotoxin levels may also be in the range of 20-50 ppb, but more preferably less than 15 ppb, even more preferably less than 10 ppb, and most preferably less than 5 ppb for total aflatoxins. Similarly contemplated mycotoxin levels also include a range of 10-30 ppb, but more preferably less than 5 ppb, even more preferably less than 3 ppb, and most preferably less than 2 ppb for total ochratoxins. Likewise, contemplated mycotoxin levels also include a range of 5-20 ppm, but more preferably less than 15 ppm, even more preferably less than 10 ppm, and most preferably less than 5 ppm for total fumonisins and/or vomitoxins.

As already discussed above, the preparation of the sub-ripe coffee cherry may include the whole coffee cherry, comprise a ground fragment of the whole coffee cherry, or include the bean, the pulp, the mucilage, and/or the hull of the quick-dried sub-ripe coffee cherry. Alternatively, it should be recognized that the preparation may also comprise an extract from the whole quick-dried sub-ripe coffee cherry (or fragment or portion thereof).

Contemplated food products especially include beverages prepared from contemplated quick-dried sub-ripe coffee cherries (or fragments or portions thereof), or beverages to which extracts or pieces from contemplated quick-dried sub-ripe coffee cherries (or fragments or portions thereof) have been added. Similarly, further contemplated food products include baked goods (e.g., bread, crackers, etc.), snacks (e.g., candy or energy bars), cereals, and other solid nutrients to which extracts or pieces from contemplated quick-dried sub-ripe coffee cherries (or fragments or portions thereof) have been added. Alternatively, contemplated food products also include a nutritional supplement in liquid or solid form that comprises an extract of the quick-dried sub-ripe coffee cherry.

Depending on the particular purpose, it should be recognized that such food products may be prepared from quick-dried sub-ripe coffee cherries having a primarily green color with less than 25% red color, more preferably with less than 25% green color, and most preferably from quick-dried sub-ripe coffee cherries having primarily (no less than 90%, most typically no less than 95%) red color with less than 5% blemished area. Still further contemplated compositions and methods are disclosed in our co-pending U.S. Patent application with the title "Methods for Coffee Cherry Products", filed on or about Apr. 16, 2003, which is incorporated by reference herein.

EXAMPLES

The following examples are provided to enable a person of ordinary skill in the art to make and use compositions according to the inventive subject matter and to illustrate exemplary compositions and methods generally described herein.

Harvest of Whole Coffee Cherries

The ripeness of the coffee cherries was determined by visually estimating the amount of green and red color (or yellow, where applicable) of the whole cherries. As the cherries ripen, the green cherries will typically increase in size and subsequently develop increasing amounts of red color. For the present examples, the coffee cherries were collected at four stages of ripeness: Completely, or almost completely green (unripe; typically less than 5% of the coffee cherry red or yellow), primarily green with some red (semi-ripe, stage 1; typically less than 25% of the coffee cherry red or yellow), primarily red with some green (semi-ripe, stage 2; typically less than 25% of the coffee cherry green), and unbroken, unblemished red (almost ripe; typically less than 10% of the coffee cherry green; area of blemishes, cuts, or otherwise broken surface less than 5%). As much as possible, whole, unbroken and uncut cherries were collected.

Quick-Drying of the Whole Coffee Cherries

Whole coffee cherries for sample extraction were prepared by drying the cherries within 1-12 hours after harvest on separate trays of an air dryer according to the following procedure. Coffee cherries (400-600 g) were weighed into beakers and washed two times with tap water, followed by a single wash with distilled water. The so washed coffee cherries were placed on a tray of an air dryer to drain, and then dried at 150-160° F. for 16-18 hours to constant weight. Drying was stopped when the weight at two consecutive one-hour intervals differed by less than 1 g. Typical yields of dried whole cherry were 160-220 g. Further analysis indicated 6-12% residual water content in the dried cherry.

Mycotoxin Analysis

In order to determine the viability of the whole coffee cherry at the unripe, semi-ripe, and almost ripe stages (see above) for use in a nutritional product (and especially for use in tea), the level of selected mycotoxins was measured and compared against comparative products and red, ripe coffee cherry by-product from coffee production. As can be clearly seen in Table 1 below, quick-dried coffee cherries of all sub-ripe harvest stages had a mycotoxin level below the detection limit of 1 ppb (as measured for aflatoxin and ochratoxin).

The mycotoxin concentration was determined in an independent laboratory by both ELISA and HPLC analysis. Based on the below results, the inventors conclude that all samples from the different sub-ripe harvest stages are suitable for direct use in a nutritional product for both human and veterinary consumption. In contrast, the by-product of coffee production (predominantly consisting of pulp, mucilage, and hull from coffee cherries) from ripe cherries of red color with blemishes (typically greater than 20% of the cherry surface) had a substantial content in both aflatoxins and ochratoxins. Similarly, the comparative product "Paradise to Go Tea" (made from coffee cherry pulp) exhibited mycotoxins in double-digit concentrations.

TABLE 1

| RIPENESS | COLOR | AFLATOXIN | OCHRATOXIN |
| --- | --- | --- | --- |
| Unripe, quick-dried | Green | <1ppb | <1ppb |
| Semi-ripe Stage 1, quick-dried | Mostly green with some red | <1ppb | <1ppb |
| Semi-ripe Stage 2, quick-dried | Mostly red with some green | <1ppb | <1ppb |
| Almost ripe, quick-dried | Red, Blemished Area <5% | <1ppb | <1ppb |
| Ripe (by-product of Coffee Production) | Red, Blemished Area >20% | >200 ppb | >500 ppb |
| Paradise to Go Tea (dry matter) | N/A | >25 ppb | >40 ppb |

Polyphenol (PP), Chlorogenic Acid (CG), and Caffeine (CF) Analysis for Quick-Dried Sub-Ripe Whole Coffee Cherries In a further series of experiments, the levels of total polyphenols, chlorogenic acid, and caffeine from quick-dried whole coffee cherry at various sub-ripe stages were measured and compared against green and roasted coffee beans. Table 2 summarizes the results of this analysis.

Interestingly, while the polyphenol (PP) level of quick-dried coffee cherries of all sub-ripe harvest stages was somewhat less than the level of green or roasted coffee beans, significant quantities of polyphenols in quick-dried sub-ripe coffee cherries still remain. Similarly, the chlorogenic acid (CG) content of quick-dried whole coffee cherry at various sub-ripe stages remained at substantial high levels as compared to roasted coffee, but was somewhat lower as compared to green beans. The caffeine (CF) level of quick-dried coffee cherries of all sub-ripe harvest stages was substantially within the caffeine level of green and roasted coffee beans (It should be pointed out that all data given are on a dry matter basis and are not normalized to the dry weight of the bean).

Polyphenol analysis: Dried whole coffee cherry (or green beans or roasted beans) (1.00 g) were ground in a rotating steel knife coffee grinder for 30 seconds to produce a ground sample. The ground sample was added to 100 mL distilled water and the resulting mixture heated to boiling in an Erlenmeyer flask for 30 minutes. The heat was removed and the mixture allowed to cool to room temperature. The resulting suspension was transferred to a 100 mL graduated cylinder and water added to bring the volume to 100 mL. The mixture was then transferred back to the Erlenmeyer flask, stirred briefly, and the solids allowed to settle. An aliquot (~3 mL) of the supernatant solution was filtered through an 0.45 µm Acrodisc filter, and the resulting clear solution was diluted 1:10 with distilled water using a volumetric flask (1.00 mL diluted with 9.00 mL distilled water).

The Folin-Ciocalteu method was used to measure the polyphenol content of the diluted solution as follows. One mL of the diluted solution was added to a test tube, mixed with 1 mL of 0.2N Folin-Ciocalteu's Phenol reagent (Sigma solution, 2N, diluted 1:10 with water), and allowed to stand 5 minutes at room temperature. One mL of 1N NaHCO$_3$ was added and the reaction mixture left at room temperature for 2 hours. The polyphenol level was determined using a UV-visible spectrophotometer standardized against catechin, at λmax=750 nm against distilled water as blank.

Chlorogenic acid: Determination of chlorogenic acid was done using HPLC separation of the filtered clear solution prepared above using standard analytical and separation protocols well known in the art. Similarly, determination of caffeine was done using HPLC separation of the filtered clear solution prepared above using standard analytical and separation protocols well known in the art (for exemplary protocols see e.g., Bispo M. S., et al. in J. Chromatogr. Sci.; 2002, January; 40(1):45-8, or Nakakuki, H. et al. in J. Chromatogr. A.; 1999, Jul. 2; 848(1-2):523-7).

TABLE 2

| RIPENESS | COLOR | % PP | % CG | % CF | CG/CF |
| --- | --- | --- | --- | --- | --- |
| Unripe, quick-dried | Green | 3.80 | 2.64 | 1.03 | 2.56 |
| Semi-ripe stage 1, quick-dried | Mostly green with some red | 3.28 | 2.70 | 1.00 | 2.70 |
| Semi-ripe stage 2, quick-dried | Mostly red with some green | 3.54 | 2.00 | 0.70 | 2.86 |
| Almost ripe, quick-dried | Red, Blemished Area <5% | 3.35 | N/D | N/D | N/D |
| Green Coffee beans | Green | 4.58 | 3.31 | 0.95 | 3.48 |
| Roasted Coffee beans | Brown | 3.93 | 0.50 | 1.20 | 0.42 |

Polyphenol (PP), Chlorogenic Acid (CG), and Caffeine (CF) Analysis for a Tea Brewed from Quick-Dried Sub-Ripe Whole Coffee Cherries Quick-dried sub-ripe coffee cherry were ground in a rotating steel knife coffee grinder for 10-30 seconds to produce a ground sample. To the ground sample (1.00 g) was added 90 mL (approx. 3 fluid oz.) boiling distilled water and the resulting mixture allowed to stand in an Erlenmeyer flask for 10 minutes to produce a coffee cherry tea. An aliquot (~3 mL) of the supernatant solution was filtered through a 0.45 µm Acrodisc filter, and the resulting clear solution was diluted 1:10 with distilled water using a volumetric flask (1.00 mL diluted with 9.00 mL distilled water). The Folin-Ciocalteu method as described above was used to measure the polyphenol content (on dry matter basis, catechin equivalents) of the so prepared coffee cherry tea. Table 3 summarizes the results.

TABLE 3

| RIPENESS | SOLVENT | % PP | % CG | % CF | CG/CF |
| --- | --- | --- | --- | --- | --- |
| Unripe, quick-dried | Water | 10.93 | 8.61 | 3.04 | 2.83 |
| Semi-ripe stage 1, quick-dried | Water | 9.38 | 7.58 | 2.72 | 2.78 |
| Semi-ripe stage 2, quick-dried | Water | 8.51 | 6.74 | 1.71 | 3.95 |
| Almost ripe, quick-dried | Water | 6.92 | 1.34 | 0.29 | 4.61 |

Brewing of Teas from Whole Coffee Cherry of Different Ripeness

The following procedure was used to prepare teas from whole coffee cherry of different ripeness for aroma and taste testing. Whole dried coffee cherry (10-20 g) was ground in a rotating steel knife coffee grinder for 10-30 seconds to produce a ground sample. The ground coffee cherry (2.0 g) was placed in a ceramic cup and of nearly boiling water (6 oz., 190-200° F.) added. The slurry was stirred and allowed to stand for 3 minutes, at which time the aroma and taste of the supernatant liquid were noted. Results are shown in Table 4.

TABLE 4

| RIPENESS | COLOR | AROMA | TASTE | PP/6 OZ. TEA |
|---|---|---|---|---|
| Unripe, quick-dried | Green | None | Almost no taste | 76 mg |
| Semi-ripe stage 1, quick-dried | Mostly green with some red | Very mild fruity | Slight fruit flavor | 66 mg |
| Semi-ripe stage 2, quick-dried | Mostly red with some green | Mild fruity | Mild fruit flavor | 71 mg |
| Almost ripe, quick-dried | Red, Blemished Area <5% | Fruity | Rich fruit flavor | 67 mg |

Thus, specific embodiments and applications of low-mycotoxin coffee cherry products have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A low-mycotoxin extraction mixture, comprising:
   a non-aqueous solvent and a plurality of quick-dried whole coffee cherries dried within 48 hours after harvest or portions thereof, wherein the portion of the quick-dried coffee cherry is pulp, and wherein the non-aqueous solvent is selected from the group consisting of an alcoholic solvent and carbon dioxide; and wherein the plurality of quick-dried whole coffee cherries or portions thereof or the low-mycotoxin extraction mixture exhibits mycotoxin levels without mycotoxin detoxification that are below 20 ppb for total aflatoxins, below 5 ppm for total fumonisins, below 5 ppm for total vomitoxins, and below 5 ppb for total ochratoxins.

2. The low-mycotoxin extraction mixture of claim 1 wherein the non-aqueous solvent is an alcoholic solvent.

3. The low-mycotoxin extraction mixture of claim 1 wherein the non-aqueous solvent is carbon dioxide.

4. The low-mycotoxin extraction mixture of claim 1 wherein the quick-dried whole coffee cherries or portions thereof are dried to a residual water content of equal or less than 20 wt %.

5. The low-mycotoxin extraction mixture of claim 1 wherein the quick-dried whole coffee cherries are unbroken unblemished red whole coffee cherries having a surface that is less than 10% green and less than 5% broken.

\* \* \* \* \*